United States Patent
Poole et al.

(10) Patent No.: US 7,175,703 B2
(45) Date of Patent: Feb. 13, 2007

(54) LIQUID COMPOSITION ADDITIVE TO REDUCE CURING TIME OF SURFACE COATINGS

(76) Inventors: Rick Poole, 3404 Ridge Smoke, San Antonio, TX (US) 78247; Mark Lane, 14900 Nacogdoches Rd., San Antonio, TX (US) 78248

( * ) Notice: Subject to any disclaimer, the term of this patent is extended or adjusted under 35 U.S.C. 154(b) by 0 days.

(21) Appl. No.: 11/478,517

(22) Filed: Jun. 29, 2006

(65) Prior Publication Data

US 2006/0243167 A1     Nov. 2, 2006

Related U.S. Application Data

(63) Continuation-in-part of application No. 11/111,134, filed on Apr. 21, 2005, now Pat. No. 7,094,287, which is a continuation-in-part of application No. 10/829,759, filed on Apr. 22, 2004, now Pat. No. 7,063,739.

(51) Int. Cl.
  *C04B 14/36* (2006.01)
  *C04B 14/02* (2006.01)

(52) U.S. Cl. .............. 106/401; 106/286.5; 106/287.17; 106/471

(58) Field of Classification Search ............. 106/286.5, 106/287.17, 401, 471
See application file for complete search history.

(56) References Cited

U.S. PATENT DOCUMENTS

| | | | |
|---|---|---|---|
| 3,876,411 A * | 4/1975 | Fowler | 71/11 |
| 3,948,830 A * | 4/1976 | Donnelly et al. | 523/401 |
| 4,310,446 A * | 1/1982 | Gaus et al. | 524/445 |
| 5,151,456 A * | 9/1992 | Elias et al. | 524/60 |
| 5,399,048 A * | 3/1995 | Walker, Jr. | 405/129.9 |
| 6,264,740 B1 * | 7/2001 | McNulty, Jr. | 106/817 |
| 6,624,232 B2 * | 9/2003 | Wilson, Sr. | 524/493 |
| 6,652,643 B1 * | 11/2003 | Black | 106/659 |
| 7,063,739 B2 * | 6/2006 | Poole et al. | 106/705 |
| 7,094,287 B2 * | 8/2006 | Poole et al. | 106/705 |
| 2002/0150429 A1 * | 10/2002 | Hull | 405/129.2 |
| 2002/0177004 A1 * | 11/2002 | Terry | 428/489 |
| 2003/0041782 A1 * | 3/2003 | Malloy et al. | 106/705 |
| 2003/0203995 A1 * | 10/2003 | Wilson | 524/2 |
| 2005/0009710 A1 * | 1/2005 | Heathman et al. | 507/203 |

* cited by examiner

*Primary Examiner*—Anthony J. Green
(74) *Attorney, Agent, or Firm*—Jackson Walker, L.L.P.; William B. Nash; Thomas E. Sisson

(57) ABSTRACT

A liquid composition, active curing additive for water or solvent borne surface coatings and sealants such: latex products, paints, putties, caulks, sports track and court construction, asphalt or coal tar seal coating, asphalt paving, micro-seal, roof tars, asphalt emulsions, crack sealants, and the like is provided. The additive functions to significantly reduce the amount of time required for the surface coating to cure and thereby allows the coated or sealed surface to be quickly returned to service. Preferably, the additive is composed of a composition of water; calcium chloride granules; citric acid granules; and an ammonium dispersing composition. Alternatively, aluminum sulfate may be utilized in place of calcium chloriade and citric acid. This formulation, when added to a liquid surface sealant or coating, will create an active process within the film of the said sealant or coating which draws water out of the film extremely fast, thereby reducing the amount of time required for the surface coating or sealant to cure.

1 Claim, No Drawings

LIQUID COMPOSITION ADDITIVE TO REDUCE CURING TIME OF SURFACE COATINGS

This patent application is a continuation-in-part of and claims priority from application Ser. No. 11/111,134 filed on Apr. 21, 2005, now U.S. Pat. No. 7,094,287 which is a continuation-in-part of and claims priority from application Ser. No. 10/829,759 filed on Apr. 22, 2004 now U.S. Pat. No. 7,063,739. This patent application incorporates by reference application Ser. Nos. 11/111,134 and 10/829,759 as if they were fully printed herein.

BACKGROUND OF THE INVENTION

The present invention relates to an active curing additive for water or solvent borne surface sealants or coatings. More particularly, the present invention relates to an active curing additive for water or solvent surface sealants and coatings such as latex products, paints, putties, caulks, sports track and court construction, asphalt or coal tar seal coating, asphalt paving, micro-seal, roof tars, asphalt emulsions, crack sealants, and the like. In some situations, the drying or cure time for a particular coating is critical. For example, asphalt parking lots must be coated to retard oxidation and protect the surface from harmful automotive fluids. However, closing a lot creates considerable problems for the business customers and owners. Customers who must park at a distance from the business are inconvenienced and this adversely affects sales.

Currently, the minimum industry cure time for a parking lot seal coating is 24 to 48 hours. Further, a location may be subsequently closed to apply painted stripes to the coated surface. This causes additional customer inconvenience.

The present inventive active curing additive, when added to such a surface sealant or paint, allows traffic to be reintroduced to a parking lot within 2 to 4 hours of the final application coat. The faster cure time of the present invention allows for striping to be applied within an hour or two of the final coat thereby eliminating not only a second customer inconvenience, but eliminating a second trip by the application contractor to the job site. As may be easily seen, the reduced cure and drying times of the present invention allows the contractor to complete more jobs per unit of time, generate greater revenues with fewer labor costs, and provide greater customer satisfaction.

The present invention provides a longer lasting coating film which does not bleed into or smudge onto the painted stripes. Additionally, the present invention may be used with traffic paint for stripes. The same advantages noted in the use of the present invention as a parking lot sealant result when used as a stripe or traffic paint, i.e., quicker cure and drying times in humid conditions resulting in greater profits and added convenience to the public.

Furthermore, the inventive active curing additive reduces curing time in other water or solvent sealants and coatings such as latex products, paints, putties, caulks, sports track and court construction, asphalt or coal tar seal coating, asphalt paving, micro-seal, roof tars, asphalt emulsions, crack sealants, and the like which all require an extended cure time. This cure time can be shortened by the active curing process triggered by the inventive active curing additive resulting in reduced down time for the customer and more productivity for the contractor.

SUMMARY OF THE INVENTION

An active curing additive which reduces cure time is provided by a mixture of water; calcium chloride granules; citric acid granules; an ammonium dispersing composition, such as ammonia, ammonium chloride, hydrous ammonia or hydrogenous ammonium. In some embodiments, aluminum sulfate may be utilized in place of the calcium chloride and citric acid. Various colorants or pigments may be further added to provide the appropriate coloration for the sealant or paint.

DESCRIPTION OF THE PREFERRED EMBODIMENT

The present inventive active curing additive may be packaged in 2, 30, 50, 250, and 4000 gallon containers for ultimate addition of an amount equal to 2% to 6% mix ratio to the coating or sealant to be employed. Such coating or sealant may be selected from a number of water or solvent borne surface sealants or coatings such as: latex products, paints, putties, caulks, sports track and court construction, asphalt or coal tar seal coating, asphalt paving, micro-seal, roof tars, asphalt emulsions, crack sealants, and the like.

In one embodiment, the active curing additive is formulated by mixing approximately 2 gallons of water, approximately 20 ounces of 97% calcium chloride granules, approximately 16 ounces of citric acid granules, and approximately 0.5 ounces of hydrous ammonia. In a second embodiment, the active curing additive is formulated by mixing approximately 2 gallons of water, approximately 24 ounces of powder aluminum sulfate, and approximately 0.5 ounces of hydrous ammonia. Colorant or pigment may be added to either embodiment to color the additive in a variable amount to achieve the desired shade or tone needed. These components may be mixed prior to arrival at the job site or mixed at the job site for application to the applicable coating or sealant.

While calcium chloride is preferred for easy of hydration, it is contemplated that other calcium products could be used but calcium chloride is preferred due to property of its ease of hydration. The ammonia additive is used to control coke gasses that are prone to make the surface of seal coat films sticky in temperatures above 90 degrees Fahrenheit or during periods of extreme barometric changes.

The inclusion of citric acid provides viscosity modification to pavement seal coats. This viscosity modification allows for aggregate sand suspension similar to the current use of polymer latex additives for the same purpose such as: Acrylic Acids, Styrene, Nitrile Rubber, Acrylonitrile Polymers, Synthetic Resin Emulsions, Polyvinyl Resins, Synthetic Polymers, Butyl Acetates.

It is common in the seal coating industry to add polymer latex to a seal coat mixture to provide extra viscosity that allows for better sand suspension in the mixture. Common polymer latex additives include Acrylic Acids, Styrene, Nitrile Rubber, Acrylonitrile Polymers, Synthetic Resin Emulsions, Polyvinyl Resins, Synthetic Polymers and Butyl Acetates. The polymer latex viscosity modifier typically comprises between 1% to 3% of the final mixture of raw seal coating prior to mixture with diluting water.

The addition of the citric acid or aluminum sulfate provides a catalyst for a new method of viscosity modification. This new method is cleaner than the old method because it is not sticky and safer because it will not shock on contact with the seal coat mixture nor will it congeal when not properly diluted with water as typical polymer latex modifiers will. This new viscosity modification provides better sand suspension than that of latex modifiers. Sands stays in suspension more consistently and the seal coat stays modified in viscosity longer. It has been reported that use of the new viscosity modification will result in substantially no loss of sand suspension.

This longer state of viscosity modification, which has been found to only lose 2% of the original modification over a period of 30 days, eliminates the current problem of having to treat seal coat that has already been treated with even more polymer latex. For instance, if a contractor purchases material for seal coating and does not complete the task within three to four days (e.g., due to rain), the contractor must typically add more polymer latex to the material to regain the proper viscosity for sand suspension thereby resulting in increased cost to the contractor.

Citric acid and aluminum sulfate are preferred for the purpose of viscosity modification because they are easily soluble in water, it is non-hazardous, and add no odor to the formula after dilution into the mixture. It is contemplated, however, that other acids may be used in place of citric acid.

As noted, coloring pigment may be added to the composition. For example, black powder pigment (such as carbon black) may be added to the composition to provide a black sealant for use on asphalt surfaces. Also, liquid black pigment may also be added to the composition to provide a black sealant. Iron oxide may be added to give the sealant a red coloring. Titanium dioxide may be used as a white coloring agent. Other colorants may be added as desired.

When the present inventive additive is mixed with a standard striping paint or other latex products, the amount of ammonium additive may be decreased and even eliminated if the particular paint or latex product has an ammonium component.

While this invention has been described as having a preferred design and use, it is understood that it is capable of further modifications, uses and/or adaptations following in general the principle of the invention and including such departures from the present disclosure as come within the known or customary practice in the art to which the invention pertains and as maybe applied to the central features hereinbefore set forth, and fall within the scope of the invention and the limits of the appended claims. In particular, although the composition is described as composed of certain quantities of the stated ingredients, it should be understood that a vast range of quantity is permissible and will still yield the desired results.

The invention claimed is:

1. An active curing additive for reducing the cure time of water and solvent borne surface sealants and coatings comprising:

a mixture of approximately 2 gallons of water, an accelerator selected from the group consisting of approximately 24 ounces of powder aluminum sulfate and approximately 20 ounces of 97% calcium chloride granules mixed with approximately 16 ounces of citric acid granules, approximately 0.5 ounces of hydrous ammonia, and a colorant, said mixture sufficient to effectively reduce said cure time of said sealant or coating when comprising two to six percent of the total volume of the mixture.

* * * * *